United States Patent
Mehta et al.

(10) Patent No.: US 11,836,268 B2
(45) Date of Patent: Dec. 5, 2023

(54) MACHINE LEARNING PLATFORM WITH MODEL STORAGE

(71) Applicant: ServiceNow, Inc., Santa Clara, CA (US)

(72) Inventors: Virendra Kumar Mehta, Cupertino, CA (US); Sriram Palapudi, Santa Clara, CA (US)

(73) Assignee: ServiceNow, Inc., Santa Clara, CA (US)

(*) Notice: Subject to any disclaimer, the term of this patent is extended or adjusted under 35 U.S.C. 154(b) by 458 days.

(21) Appl. No.: 17/062,409

(22) Filed: Oct. 2, 2020

(65) Prior Publication Data

US 2022/0108035 A1   Apr. 7, 2022

(51) Int. Cl.
*G06F 21/62* (2013.01)
*G06F 21/60* (2013.01)
*G06N 20/00* (2019.01)
*G06F 8/658* (2018.01)
*G06F 18/214* (2023.01)

(52) U.S. Cl.
CPC .......... *G06F 21/6227* (2013.01); *G06F 8/658* (2018.02); *G06F 18/214* (2023.01); *G06F 21/602* (2013.01); *G06N 20/00* (2019.01)

(58) Field of Classification Search
CPC .... G06F 21/6227; G06F 21/602; G06F 8/658; G06F 18/214; G06N 20/00
See application file for complete search history.

(56) References Cited

U.S. PATENT DOCUMENTS

| | | | |
|---|---|---|---|
| 11,062,217 B1* | 7/2021 | Kapoor | G06F 16/907 |
| 2015/0172321 A1* | 6/2015 | Kirti | H04L 63/1425 726/1 |
| 2020/0082270 A1* | 3/2020 | Gu | G06N 5/045 |
| 2020/0358599 A1* | 11/2020 | Baracaldo Angel | H04L 9/085 |
| 2020/0394566 A1* | 12/2020 | Martín | G06N 20/20 |
| 2021/0083855 A1* | 3/2021 | Polleri | H04L 9/0894 |
| 2021/0117859 A1* | 4/2021 | Rogers | G06N 3/045 |
| 2021/0125051 A1* | 4/2021 | Linton | G06F 21/53 |
| 2021/0241166 A1* | 8/2021 | Horesh | G06F 21/602 |
| 2021/0264321 A1* | 8/2021 | Xiang | H04L 67/34 |
| 2021/0383187 A1* | 12/2021 | Kalyan | H04L 41/16 |
| 2022/0019663 A1* | 1/2022 | Stapleton | H04L 9/008 |
| 2022/0083363 A1* | 3/2022 | Lewis | H04L 67/34 |

* cited by examiner

*Primary Examiner* — Hee K Song
(74) *Attorney, Agent, or Firm* — Van Pelt, Yi & James LLP

(57) ABSTRACT

A request to perform a prediction using a machine learning model of a specific entity is received. A specific security key for the machine learning model of the specific entity is received. At least a portion of the machine learning model is obtained from a multi-tenant machine learning model storage. The machine learning model is unlocked using the specific security key and the requested prediction is performed. A result of the prediction is provided from a prediction server.

20 Claims, 8 Drawing Sheets

MACHINE LEARNING PLATFORM WITH MODEL STORAGE

BACKGROUND OF THE INVENTION

Machine learning involves training a prediction model from possibly large bodies of disparate datasets. Once trained, a machine learning model can be used by a machine learning prediction server to perform predictions to solve a machine learning problem. Based on the particular machine learning problem, different machine learning models can be utilized by a prediction server to predict the appropriate result. When offered as a service, a model can be trained by selecting training data and requesting a model be trained using the provided data. A subsequent prediction request is directed to the offered machine learning prediction service and a prediction result is returned. The prediction result is determined by using a prediction server prepared with the appropriate trained machine learning model applied to the prediction request.

BRIEF DESCRIPTION OF THE DRAWINGS

Various embodiments of the invention are disclosed in the following detailed description and the accompanying drawings.

DETAILED DESCRIPTION

Figure 1:
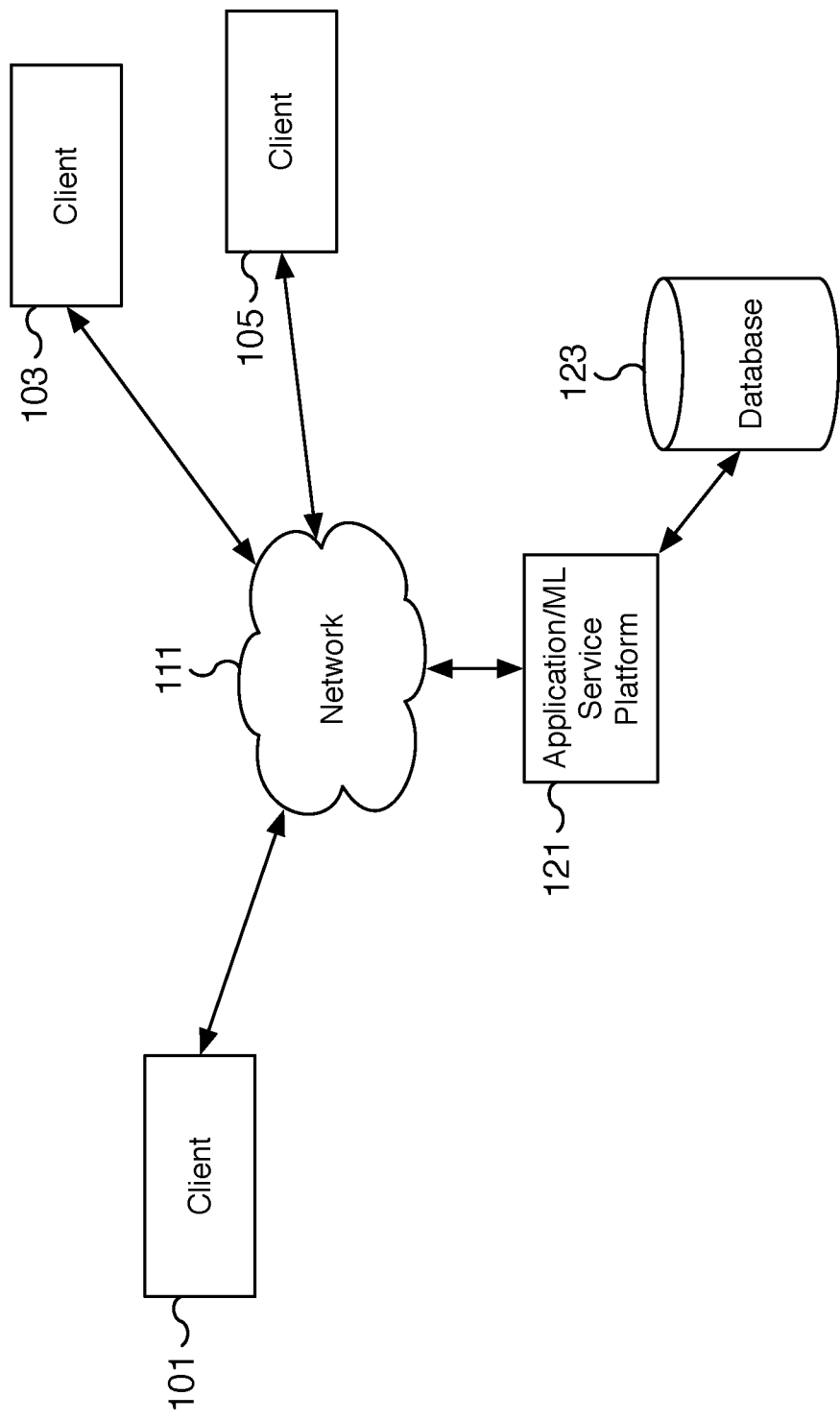
FIG. 1 is a block diagram illustrating an example of a network environment of a machine learning platform and service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An efficient and security-focused machine learning platform and service is disclosed. Using the disclosed techniques, a machine learning platform provides a machine learning service to train and apply machine learning models. In response to a training request, a machine learning model is trained and stored by the machine learning service in a machine learning model store. In response to a machine learning prediction request, the appropriate model is retrieved from the model store and applied to determine a prediction result. The result is made available by the machine learning service in response to the prediction request. In various embodiments, the machine learning platform offering the machine learning service includes at least one or more training servers, one or more prediction servers, and a model store.

In various embodiments, the machine learning platform includes a machine learning model store. The model store is used to store the most up to date version of each machine learning model and can, in some embodiments, store multiple versions of each model along with versioning information. In various embodiments, updates and refreshes to a machine learning model can be applied to the model version stored in the model store. Subsequent prediction requests to the service can utilize the most current model for prediction requests. In some embodiments, an updated model can be dynamically pushed to any prediction servers utilizing an out-of-date version of the model. For example, each version of a model has a unique identifier associated with the model and the model's version information. Each prediction server has a unique identifier, such as an IP address. Each prediction server can effectively check out a machine learning model and the identifier of the prediction server is associated with the identifier of the checked-out model. In some embodiments, a check out list tracks what model, including which version of a model, is being utilized by which prediction servers. In the event a model is updated and assigned a new version, the prediction servers associated with the out-of-date model can be notified of the update. Depending on the particular usage scenario, a prediction server can be configured to dynamically and/or proactively receive an updated model, for example, to apply to future prediction requests. In some embodiments, a model store can store multiple versions of a model. For example, a model store can store multiple versions of a model in their entirety and/or incremental differences between versions. A prediction server can utilize the different model versions as required to determine a prediction based on an older version of a machine learning model.

In various embodiments, the disclosed machine learning service offers a security-focused approach while maximizing efficient use of compute resources. The machine learning service is configured to support multiple customers while also ensuring that each customer's sensitive data is appropriately siloed. For example, each customer stores its customer data on a single-tenant data store. The data store can include one or more customer databases and can be replicated and/or distributed for improved performance. In some embodiments, the machine learning platform includes a scheduler for assigning/allocating training and prediction servers to training and prediction requests, respectively. Training of machine learning models is performed by scheduling a multi-tenant training server from one or more available training servers to a specific tenant (or customer) with a training request. An assigned training server applies the selected customer training data to train a machine learning model. The customer training data may originate from the customer's single-tenant data store. In various embodiments, at any given instant, only a single customer's data is active for any one particular training server. Once trained, the machine learning model is locked using a customer security key and the locked model is securely stored in a model store. For example, the machine learning model can be encrypted using a security encryption key such as a public key associated with the customer. In various embodiments, the model store is a multi-tenant model store where each tenant can only access and unlock the appropriate models, such as the customer's own models and/or the models a customer has been granted access to.

Using the disclosed machine learning platform and an associated machine learning prediction service, customers can apply trained models to perform predictions using the models they have access to. In response to a request to perform a prediction, a scheduler allocates a multi-tenant prediction server from one or more available prediction servers to serve a customer's prediction request. The appropriate locked model is retrieved from the model store and utilized by the assigned prediction server. The model is unlocked using a security key, such as a private key of the customer. For example, in response to a prediction request, the appropriate encrypted customer model is retrieved from a multi-tenant model store and unlocked at an assigned prediction server. At the prediction server, the model is applied to the input data to infer a prediction result. The prediction result is then returned as the return result to the prediction request. In various embodiments, at any given instant, only a single customer's data (including model data) is active for any one particular prediction server. In the event the prediction server is no longer needed to serve prediction requests from that customer, the customer's data including the customer's machine learning model are purged from the prediction server. The compute resources of the prediction server can then be allocated by a scheduler to a different customer of the machine learning prediction service.

In some embodiments, a request is received to perform a prediction using a machine learning model of a specific entity. For example, a customer of a machine learning prediction service uses a client, such as a web browser, to request a machine learning prediction. The request can specify and/or be associated with a specific machine learning model such as a specific model that the customer has previously trained. A specific security key is received for the machine learning model of the specific entity. For example, a private key of the customer is retrieved that can unlock a locked version of the machine learning model specified by the prediction request. In various embodiments, machine learning models are stored in locked form on a multi-tenant machine learning model store and require a security key to access. At least a portion of the machine learning model is obtained from a multi-tenant machine learning model storage. For example, the locked machine learning model is transmitted from the model storage to a prediction server. In some embodiments, the machine learning model is unlocked using the specific security key. For example, the machine learning model can be decrypted using the customer's security key. Once unlocked, the model can be utilized to perform a prediction. In some embodiments, the requested prediction is performed. For example, the unlocked model is used to infer a prediction result. The input data for the prediction can be specified in the prediction request. A result of the prediction is provided from the prediction server. For example, the result is returned from the prediction server to the client in response to the prediction request.

FIG. 1 is a block diagram illustrating an example of a network environment of a machine learning platform and service. In the example shown, clients 101, 103, and 105 access cloud-based machine learning services hosted by application and machine learning service platform 121 via network 111. Network 111 can be a public or private network. In some embodiments, network 111 is a public network such as the Internet. In various embodiments, clients 101, 103, and 105 are network clients such as web browsers used by customers for accessing web-based cloud services. Application and machine learning service platform 121 provides web and machine learning services including 121 web applications such as web-based configuration management database (CMDB) services and machine learning services such as machine learning model training and machine learning prediction. In some embodiments, the web application provides a front-end to the machine learning services. For example, a web service can allow a user to select customer data from a database such as database 123 for training a machine learning model. As another example, a web service can allow a user to select a model and customer data from a database such as database 123 for predicting a machine learning result. In various embodiments, application and machine learning service platform 121 utilizes database 123 for storing and retrieving various forms and types of data. For example, customer data is written to and retrieved from database server 123. Moreover, customer data stored in database 123 can be utilized to train a machine learning model and/or run predictions using a trained model. In some embodiments, database 123 is a relational database such as a My SQL database. In various embodiments, database 123 responds to database queries such as SQL queries originating from application and machine learning service platform 121.

In some embodiments, application and machine learning service platform 121 is a machine learning platform offering machine learning services. Although depicted in FIG. 1 as a single element, application and machine learning service platform 121 includes multiple components including one or more servers. For example, application and machine learning service platform 121 can include one or more application servers for hosting web applications related to machine learning services. Application and machine learning service platform 121 can also include additional components such as a scheduler component, one or more training server components, one or more prediction server components, and/or a machine learning model storage component. In various embodiments, each of these components can function as separate functioning components such as separate servers or data stores and need not, for example, be limited to run on the same hardware server. In some embodiments, application and machine learning service platform 121 includes a cluster of training and prediction servers used to load balance training and prediction requests. Allocation of a particular training or prediction server can be assigned by a scheduling component in response to a training or prediction request. In various embodiments, application and machine learning service platform 121 includes a machine learning model data store for storing trained machine learning models.

As shown in FIG. 1, application and machine learning service platform 121 is accessible by multiple clients. In some embodiments, each client can be associated with a different customer and application and machine learning service platform 121 balances the performance and security needs of multiple customers. For example, in some embodiments, multiple customers can send training and prediction requests to be served by the machine learning services of application and machine learning service platform 121. Once a request is received at application and machine learning service platform 121, a training or prediction server is allocated to service the request. In some embodiments, while processing a training or prediction request, the training or prediction server can only access a single customer's data to prevent the comingling of customers' data. However, the model storage of application and machine learning service platform 121 may be a multi-tenant model store. For example, a machine learning model store may store models for different customers where the models are stored in locked form. When accessed by a prediction server, the locked models are retrieved from the multi-tenant model store and unlocked using the appropriate customer security key. In various embodiments, this division between single-tenant and multi-tenant components of application and machine learning service platform 121 optimizes for the efficient and secure use of both machine learning compute resources as well as storage resources.

In some embodiments, cloud-based machine learning services can be implemented by pairing application and machine learning service platform 121 with one or more databases such as database 123. For example, application and machine learning service platform 121 can utilize database 123 as an input and/or output source of customer data. In some embodiments, database 123 functions as a source for training data for training a machine learning model. Database 123 can also include a database of trained machine learning models available for a specific entity or customer. In some embodiments, database 123 can be used as an input source for prediction requests by identifying a particular machine learning model to apply for a prediction request and/or input data to apply a specified model to. Database 123 can also be used to store prediction results. In some embodiments, database 123 is a single-entity database and is only accessible by a single customer. To support multiple customers, each additional customer accesses its own database (not shown). Although database 123 is shown distinct from application and machine learning service platform 121 in FIG. 1, in some embodiments, application and machine learning service platform 121 includes one or more databases such as database 123. In some embodiments, although database 123 is part of the application and machine learning service platform 121, database 123 may also be accessible by other services. For example, database 123 can also be a configuration management database (CMDB) used for providing CMDB services while also accessible for providing machine learning services.

Although single instances of some components have been shown to simplify the diagram, additional instances of any of the components shown in FIG. 1 may exist. For example, as previously discussed, application and machine learning service platform 121 may include one or more servers and multiple components such as training servers, prediction servers, a scheduler, and model storage (not shown). Similarly, database 123 may include one or more database servers and may not be directly connected to application and machine learning service platform 121. For example, database server 123 and its components may be replicated and/or distributed across multiple servers and/or components. In various embodiments, application and machine learning service platform 121 may host a cloud-based service that serves one or multiple customers whereas database 123 may be a single-tenant database that only stores data for one specific customer. Each customer may have a corresponding siloed database such as database 123 to maintain data separation. In some embodiments, some components of application and machine learning service platform 121 may be multi-tenant components that serve multiple customers and some components may be single tenant components that are dedicated to serving a single customer. In some embodiments, components not shown in FIG. 1 may also exist.

Figure 2:
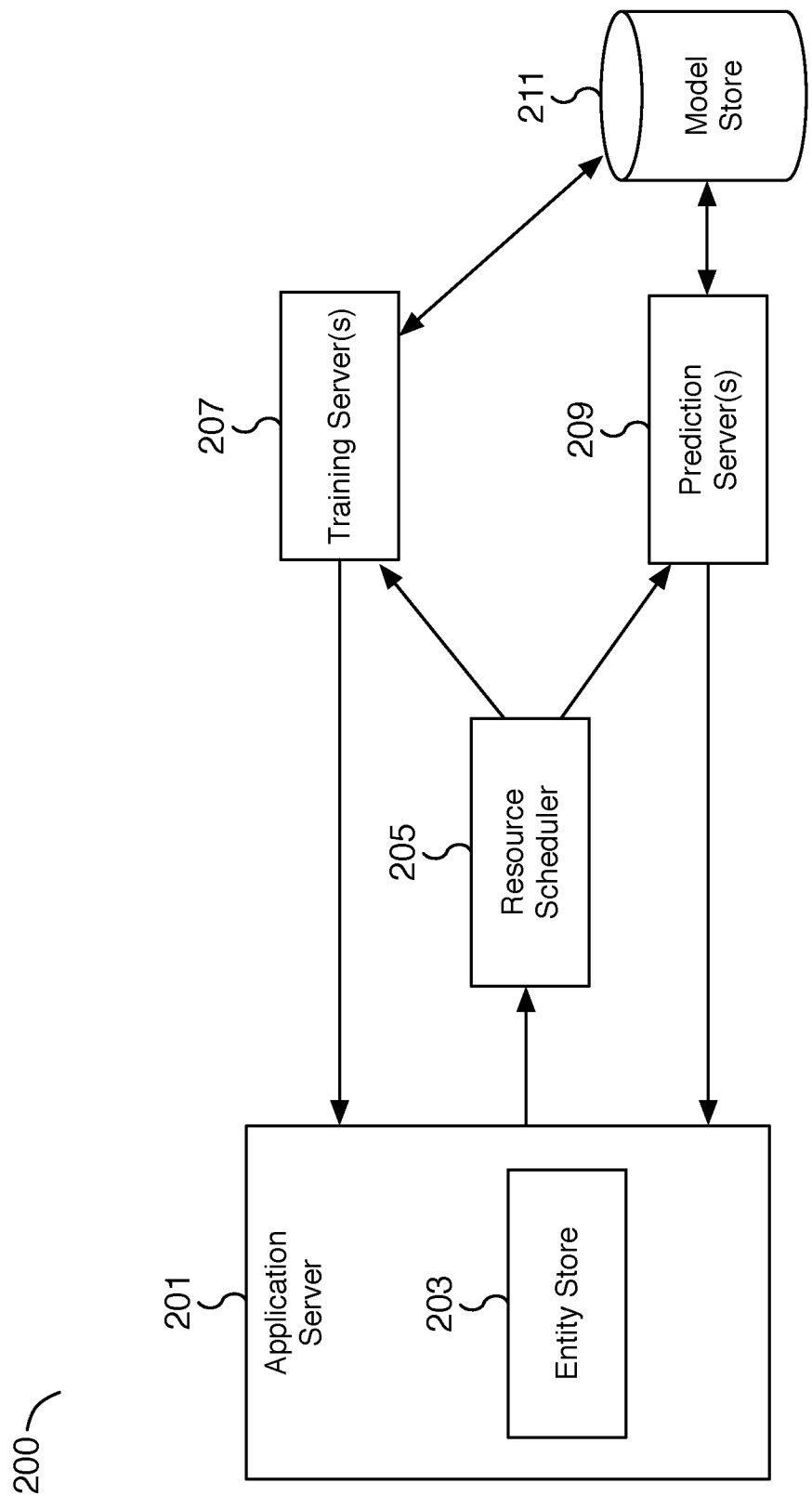
FIG. 2 is a block diagram illustrating an example of a machine learning platform.

FIG. 2 is a block diagram illustrating an example of a machine learning platform. In the example shown, machine learning platform 200 is used to provide machine learning services including services for training a machine learning model, securely storing and accessing a machine learning model, and applying a machine learning model to determine a prediction result. Machine learning platform 200 includes application server 201, entity store 203, resource scheduler 205, training servers 207, prediction servers 209, and model store 211. The arrows between the components indicate communication channels. In some embodiments, the communication channels are encrypted network channels that communicatively connect the different components. The directions of the arrows between the components indicate the general flow of data/information between components. In some embodiments, machine learning platform 200 is application and machine learning service platform 121 of FIG. 1. In some embodiments, machine learning platform 200 further includes database 123 of FIG. 1.

In some embodiments, application server 201 is an application server, such as a web application server, for hosting portions of a machine learning service. For example, application server 201 can serve as a front end to receive and respond to training and prediction requests from network clients. In various embodiments, application server 201 may include one or more server nodes, for example, to distribute the workload related to handling requests. In the example shown, application server 201 includes entity store 203. For example, application server 201 can be communicatively connected to the data sources of entity store 203. In some embodiments, entity store 203 includes one or more single-tenant entity stores and may include multiple separate distributed and/or replicated data stores. For example, entity store 203 may include one or more single-tenant customer databases such as database 123 of FIG. 1. Entity store 203 can store customer data and/or information related to different machine learning models associated with a customer as well as prediction results. In some embodiments, a client request to application server 201 can reference data from entity store 203 for training a machine learning model and/or for input data to a machine learning prediction. In some embodiments, entity store 203 is used to store security keys and/or data related to security keys. For example, a version of a customer's private encryption key can be stored in entity store 203. In some embodiments, entity store 203 includes a caching component and can function as a cache for customer data.

In some embodiments, resource scheduler 205 is utilized to schedule training servers 207 to process training requests and/or to schedule prediction servers 209 to process prediction requests. For example, in response to a training or prediction request received at application server 201, resource scheduler 205 is notified by application server 201 to allocate an appropriate server (from training servers 207 or prediction servers 209) to the request. In some embodiments, training servers 207 and/or prediction servers 209 are implemented as a cluster of available servers that are scheduled as required to process training and prediction requests respectively. For example, in response to a training request, resource scheduler 205 identifies and assigns an available training server of training servers 207 to the incoming training request. When the training task is complete, the allocated training server is made available and can be assigned by resource scheduler 205 to a new training request. Similarly, resource scheduler 205 can allocate a prediction server of prediction servers 209 to incoming prediction requests. In some embodiments, resource scheduler 205 is implemented as one or more components. For example, the functionality for scheduling training and prediction servers can be implemented by resource scheduler 205 as two separate components. In various embodiments, resource scheduler 205 can process requests for multiple customers by assigning a single training or prediction server to each customer for the duration of the machine learning request. In some embodiments, resource scheduler 205 can directly (or indirectly) forward a training or prediction request to an assigned training or prediction server, respectively.

In some embodiments, training servers 207 is a cluster of one or more machine learning training servers. When provided with a training data set, a training server of training servers 207 trains a machine learning model. In some embodiments, the model is subsequently locked or encrypted using a security key and stored at model store 211. In some embodiments, training servers 207 can process machine learning training requests from different customers but each training server of training servers 207 only actively processes a single customer at any given time. This security limitation prevents the comingling of customer data on training servers 207. For example, when a customer is no longer assigned to a particular training server, that customer's data is also no longer stored at the server. The results of training, such as a notification that training of a requested model has been successfully initiated and/or has completed, are returned to application server 201 and can be forwarded to the appropriate client.

In some embodiments, prediction servers 209 is a cluster of one or more machine learning prediction servers. When provided with a prediction request, a prediction server of prediction servers 209 predicts a machine learning result by applying a machine learning model to an input data set. In some embodiments, the model is retrieved from model store 211 and unlocked using a security key of the customer. In some embodiments, prediction servers 209 can process machine learning prediction requests from different customers but each prediction server of prediction servers 209 only actively processes a single customer at any given time. This security limitation prevents the comingling of customer data on prediction servers 209. For example, when a customer is no longer assigned to a particular prediction server, that customer's data, including its machine learning model, is also no longer stored at the server. In various embodiments, prediction results determined by prediction servers 209 can be stored in model store 211 and/or returned to application server 201. Application server 201 can forward a prediction result to the appropriate client.

In some embodiments, model store 211 is used to secure store machine learning models. For example, customer machine learning models are stored in a locked form at model store 211. As described, model store 211 can be multi-tenant storage where the stored machine learning data for each tenant is locked using a different corresponding key. In some embodiments, each customer's models are encrypted and decrypted using a customer's security key. The security key can correspond to a private/public key pair. For example, a public key or certificate can be used to encrypt a machine learning model and a corresponding private key can be used to decrypt the model. In some embodiments, model store 211 is a network storage device and is implemented as network-attached-storage or using a storage area network. In some embodiments, model store 211 is implemented by mounting model store 211 to training servers 207 and/or prediction servers 209.

In some embodiments, model store 211 can store multiple versions of each machine learning model. For example, multiple versions or revisions of a model are stored at model store 211 in their entirety and/or as incremental differences. By storing different versions of a model, a prediction request can apply different versions of the model as requested. In various embodiments, each model is stored with an associated identifier that includes a version identifier that can be used to differentiate between versions. In some embodiments, model store 211 can receive updates and/or refreshes to the stored models and can update the models as appropriate. For example, an update to a machine learning model can be applied to a stored machine learning model to ensure the stored model is up to date.

In some embodiments, the prediction servers of prediction servers 209 and the models actively in use by the prediction servers are tracked. The association can be used to identify what models are being used by which servers. In the event a model is updated, the mapping can be used to identify which prediction servers are utilizing an out of date model. In some embodiments, the new model (or update) is pushed to the appropriate prediction servers of prediction servers 209 to bring the checked-out model up to date.

Figure 3:
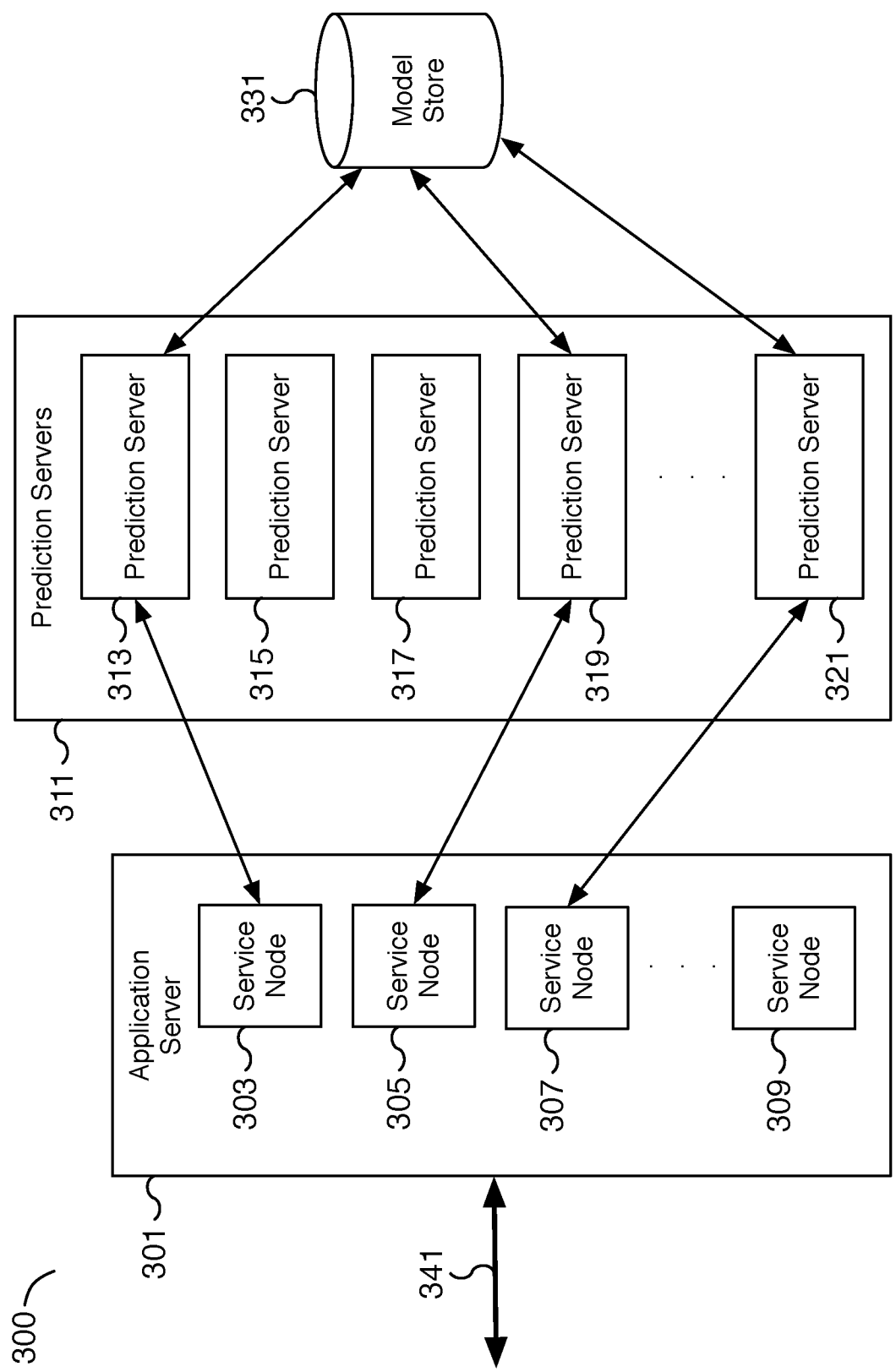
FIG. 3 is a block diagram illustrating an example of a machine learning platform for machine learning prediction.

FIG. 3 is a block diagram illustrating an example of a machine learning platform for machine learning prediction. In the example shown, machine learning platform 300 is used to provide machine learning services for predicting a machine learning result using a machine learning model. Machine learning platform 300 includes application server 301, prediction servers 311, and model store 331. The arrows between the components indicate communication channels. In some embodiments, the communication channels between application server 301 and prediction servers 311 are encrypted network channels that communicatively connect the different components. The directions of the arrows between the components indicate the general flow of data/information between components can be bi-directional. In some embodiments, additional components may exist as part of machine learning platform 300 but are not shown in FIG. 3. For example, in some embodiments, a scheduler such as resource scheduler 205 of FIG. 2 exists to assign a prediction server of prediction servers 311 to a service node of application server 301. In some embodiments, machine learning platform 300 is located in a single data center and multiple instances of machine learning platform 300 can be located across different data center or network locations.

In some embodiments, application server 301 includes multiple service nodes such as service nodes 303, 305, 307, and 309. In the example shown, application server 301 serves a single customer and the multiple service nodes of application server 301 help to distribute the workload for a single customer. The multiple service nodes of application server 301 increase the performance and reliability of the machine learning service, for example, by allowing application server 301 to handle multiple requests simultaneously while also offering redundant functionality. In various embodiments, application server 301 can be configured with fewer or more service nodes as required. In some embodiments, each service node is an instance of an application server component, such as a web application server. In some embodiments, service nodes 303, 305, 307, and 309 are each an application server such as application server 201 of FIG. 2 and each node has access to an entity store such as entity store 203 of FIG. 2. In the example shown, each service node of application server 301 serves a single customer and can include a corresponding instance of a customer entity store.

In some embodiments, prediction servers 311 includes multiple prediction servers such as prediction servers 313, 315, 317, 319, and 321. As with the availability of multiple service nodes, the multiple prediction servers of prediction servers 311 increase the performance and reliability of the machine learning service, for example, by allowing prediction servers 311 to handle multiple prediction requests simultaneously while also offering redundant functionality. In various embodiments, prediction servers 311 is prediction servers 209 of FIG. 2 and each of prediction servers 313, 315, 317, 319, and 321 is part of a cluster of prediction servers of prediction servers 209 of FIG. 2. Unlike application server 301, prediction servers 311 can serve multiple customers, but each prediction server of prediction servers 311 can only serve one customer at a time. For example, prediction servers 311 can serve customers corresponding to additional application servers not shown in FIG. 3 but that correspond to different customers than the one served by application server 301. In the example shown, prediction servers 313, 315, 317, 319, and 321 can each be assigned to handle a prediction request assigned to a service node of application server 301, such as one of service nodes 303, 305, 307, and 309. In various embodiments, prediction servers 313, 315, 317, 319, and 321 can each utilize a machine learning model and input data to infer a prediction result. The appropriate machine learning model and input data can be specified by its associated service node. Once a prediction result is determined, the result can be provided to the associated service node where it can be forwarded to the original requesting client. In some embodiments, the input data for the prediction request can be retrieved from an entity store of the customer and the machine learning model is retrieved from model store 331.

In some embodiments, model store 331 is machine learning model storage. Model store 331 securely stores machine learning models for a customer. In some embodiments, each stored model is locked using a security key. For example, a model can be encrypted using an encryption key such as a public encryption key and subsequently decrypted using the corresponding private key. In some embodiments, model store 331 is a multi-tenant model store that stores models of multiple customers, each encrypted using a corresponding customer security key. Although multiple customers can access the model store, for example, via an associated prediction server, each customer can only access and use a machine learning model by first unlocking the model with the appropriate security key. In various embodiments, model store 331 is a network storage device. For example, model store 331 can be implemented as network-attached-storage, using a storage area network, or using another appropriate technique. In some embodiments, model store 331 is a mounted volume of the prediction servers of prediction servers 311. In the example shown, prediction server 313, 319, and 321 retrieve a locked machine learning model from model store 331 to perform a prediction determination. Each prediction server can retrieve a different machine learning model that is unlocked or decrypted using a different corresponding security key. In some embodiments, the retrieved model is unlocked by the associated prediction server or by model store 331. In the example shown, prediction servers 315 and 317 are not currently accessing model store 331.

In some embodiments, model store 331 receives updates and/or refreshes to machine learning models. The received updates/refreshes can be applied to the appropriate stored models to bring them up to date. In various embodiments, different versions of a model can be stored to maintain a version history. For example, the entirety of a version of a machine learning model can be stored and/or the incremental differences between versions of the model. In various embodiments, the models and their versions each have an associated unique identifier that can be used to identify when a model is no longer out of date and/or to specify a particular model for use in a prediction request. In some embodiments, each prediction server of prediction servers 311 has a corresponding unique identifier. When a model is received at a prediction server, the identifier of the prediction server and the received model are tracked. This allows a model that is updated while in use by a prediction server to be updated. For example, a prediction server utilizing a version of a machine learning model can receive an update notification that an update exists for the version of the model it currently has. The updated model can be received to replace the now out-of-date model. In some embodiments, model store 331 functions as a central location for all machine learning models and can be optimized for the storing, retrieving, securing, and updating of machine learning models. Unlike an entity store of a service node that can be used to store a variety of a single customer's data, model store 331 is optimized for the particular use requirements of machine learning models and can store models associated with multiple different customers. Although model store 331 is shown as a single component, in various embodiments, model store 331 can be implemented as multiple individual model stores, for example, by including redundant and/or distributed storage systems. In some embodiments, model store 331 is model store 211 of FIG. 2.

In various embodiments, application server 301 receives prediction requests and returns prediction results via network communication channel 341. Incoming prediction requests are directed to an available service node such as one of the service nodes 303, 305, 307 or 309. To service a prediction request, an assigned service node is paired with a prediction server to determine a prediction result. Once the prediction result is determined, the result is returned to the customer's client via network communication channel 341. In the example shown, service node 303 is paired with and communicates with prediction server 313, service node 305 is paired with and communicates with prediction server 319, and service node 307 is paired with and communicates with prediction server 321. Service node 309 is shown as not communicating with a prediction server. Service node 309 may be available for other tasks such as processing a training request or may be assigned to the next prediction request. Similarly, prediction servers 315 and 317 are shown as not communicating with a service node and are available for processing a future incoming prediction request. In various embodiments, the mapping between a service node and a prediction server can be assigned by a scheduler component (not shown) such as resource scheduler 205 of FIG. 2.

Figure 4:
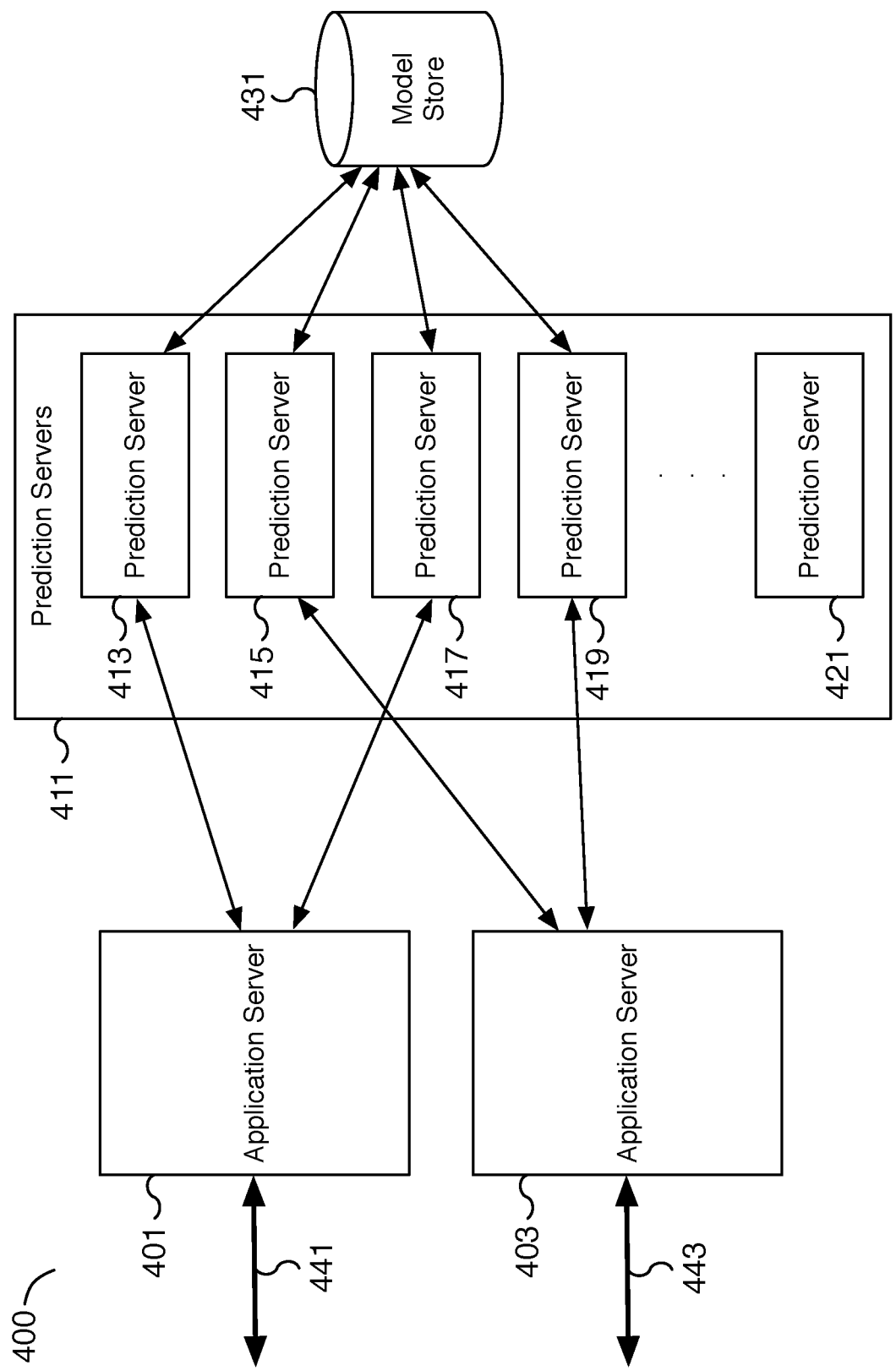
FIG. 4 is a block diagram illustrating an example of a scalable machine learning platform for machine learning prediction.

FIG. 4 is a block diagram illustrating an example of a scalable machine learning platform for machine learning prediction. In the example shown, machine learning platform 400 is used to provide machine learning services for predicting a machine learning result using a machine learning model. Machine learning platform 400 includes application servers 401 and 403, prediction servers 411, and model store 431. The arrows between the components indicate communication channels. In some embodiments, the communication channels between application servers 401 and 403 and prediction servers 411 are encrypted network channels that communicatively connect the different components. The directions of the arrows between the components indicate the general flow of data/information between components can be bi-directional. In some embodiments, additional components may exist as part of machine learning platform 400 but are not shown in FIG. 4. For example, in some embodiments, a scheduler such as resource scheduler 205 of FIG. 2 exists to assign a prediction server of prediction servers 411 to a service node (not shown) of application servers 401 and 403. In some embodiments, machine learning platform 400 is located in a single data center and multiple instances of machine learning platform 400 can be located across different data center or network locations. In contrast with machine learning platform 300 of FIG. 3, machine learning platform 400 includes an additional application server to demonstrate how multiple customers are supported. Although only two applications servers are shown in FIG. 4, machine learning platform 400 can include additional application servers and can be scaled up to support many more applications servers and their associated customers.

In some embodiments, application servers 401 and 403 are each a different instance of application server 301 of FIG. 3. For example, each of application servers 401 and 403 can include a cluster of service nodes, and each service node can include its own entity store. In some embodiments, applications servers 401 and 403 are each a different instance of application server 201 of FIG. 2. In some embodiments, applications servers 401 and 403 implement the application server functionality of application and machine learning service platform 121 of FIG. 1. In some embodiments, application server 401 serves a first customer and application server 403 serves a second different customer. Each customer can have multiple clients that submit requests via its own corresponding application server. Clients of the first customer connect via network communication channel 441 to application server 401 and clients of the second customer connect via network communication channel 443 to application server 403. In some embodiments, network communication channels 441 and 443 are each a different instance of network communication channel 341 of FIG. 3.

At application servers 401 and 403, an incoming prediction request is directed at a service node (not shown) of the corresponding application server. The service node is paired with an available prediction server of prediction servers 411. For example, prediction servers 413, 415, 417, 419, and 421 of prediction servers 411 are available to service any customer and the customers' prediction requests. While prediction servers 413, 415, 417, 419, and 421 can serve multiple customers, each only services a single customer at any given time. In the example shown, prediction servers 413 and 417 are currently allocated to application server 401 whereas prediction servers 415 and 419 are currently allocated to application server 403. Prediction server 421 is an example of a prediction server that is not in use and is available to service the next incoming prediction request, whether it originates from application server 401 or application server 403. In various embodiments, a scheduler (not shown) such as resource scheduler 205 of FIG. 2 allocates and assigns the prediction servers of prediction servers 411 to application servers and their associated service nodes. In some embodiments, prediction servers 411 is prediction servers 311 of FIG. 3.

As described above with respect to FIG. 3 and model store 331 of FIG. 3, model store 431 is a machine learning model store that stores multiple machine learning models of different customers. In the example shown, model store 431 stores machine learning models of customers associated with application server 401 and 403. In response to a prediction request, the assigned prediction server receives the appropriate machine learning model from model store 431. In various embodiments, the models stored at model store 431 are locked. For example, the models may be encrypted and require a security key to unlock. The model can be unlocked at model store 431 or, in some embodiments, the models are unlocked at the prediction server prior to use. For example, prediction server 413 receives a locked model from model store 431 and a corresponding security key from application server 401. Prediction server 413 then proceeds to unlock the model, for example, by decrypting the model and storing the unlocked model in its local memory. In various embodiments, prediction server 413 keeps the unlocked model in memory as long as it is continuously servicing prediction requests on behalf of application server 401. Once prediction server 413 is no longer need by application server 401, the unlocked model is purged from memory and prediction server 413 can be allocated to a different customer and its associated application server, such as application server 403. In response to a subsequent prediction request received in the future, prediction server 413 will need to receive and unlock the corresponding machine learning model since the unlocked model previously used to determine already completed prediction results has been purged. In the example shown, application servers 401 and 403 each only service a single customer, the prediction servers of prediction servers 411 are configured to support multiple customers but only a single customer at a time, and model store 431 serves to store models corresponding to multiple customers but each model is encrypted with a customer specific security key. The delineation of customer access allows for machine learning platform 400 to securely and efficiently store customer data without needlessly comingling the data of different customers. The ability for model store 431 to operate as a multi-tenant model store allows for an efficient utilization of storage, compute, and network resources, among others. Moreover, machine learning platform 400 is able to scale and meet the performance requirements for machine learning prediction requests even as the number of customers and the demands of machine learning services increase. For example, machine learning platform 400 can scale to multiple customers even as the size of machine learning models and the number of versions of each model that need to be retained increase.

In the above example, the delineation between single and multi-tenant components is described with respect to customers. However, other delineations can be appropriate as well. For example, instead of only serving a single customer, application server 401 can serve a group of customers and application server 403 can serve another group of customers.

In some embodiments, the customer groups may even overlap. As another example, models stored in model store 431 can be locked and unlocked by customers, by groups of customers, or in accordance with another security policy. For example, in some embodiments, a model can be unlocked by any entity with the appropriate security key, which may or may not map directly to a single customer. In some embodiments, a customer can grant other customers access to one or more of its trained machine learning models. As another example, an entity such as a service provider of machine learning platform 400 can provide and grant access to one or more machine learning models to one or more different customers or customer groups.

Figure 5:
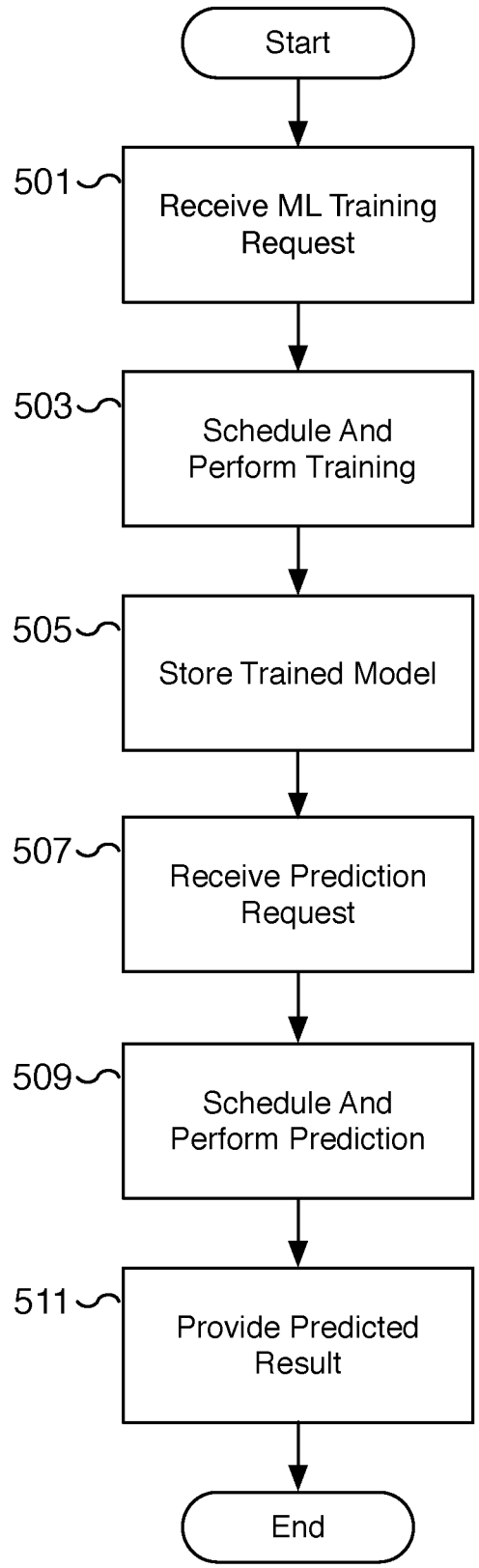
FIG. 5 is a flow chart illustrating an embodiment of a process for providing a machine learning service.

FIG. 5 is a flow chart illustrating an embodiment of a process for providing a machine learning service. For example, the process of FIG. 5 can be used to train a machine learning model and to perform predictions using the trained model. In various embodiments, the process of FIG. 5 is performed using application and machine learning service platform 121 and/or database 123 of FIG. 1, machine learning platform 200, machine learning platform 300, and/or machine learning platform 400. For example, in various embodiments, incoming training and prediction requests are received at an application server. The requests are scheduled to utilize a training or prediction server by a scheduler such as resource scheduler 205 of FIG. 2, the training is performed on a training server, and the prediction is performed on a prediction server.

At 501, a machine learning training request is received. For example, a network client sends a machine learning request which is received at an application server, such as a web application server. The request may utilize one or more encrypted network protocols such as HTTPS and TLS. In some embodiments, the request specifies the training data to use for training the machine learning model. For example, the request can include the training data embedded in the request or a reference to the training data. In some embodiments, the referenced training data is data stored in a customer database such as database 123 of FIG. 1 and/or a customer entity store such as entity store 203 of FIG. 2. In some embodiments, a service node of the application server, such as one of service nodes 303, 305, 307, or 309 of FIG. 3, receives and is assigned to facilitate performing the training request.

At 503, training of a machine learning model is scheduled and performed. For example, a training server is scheduled to perform the actual machine learning training with the specified training data. In some embodiments, the training server is assigned by a scheduler such as resource scheduler 205 of FIG. 2. For example, a cluster of training servers are available to process training jobs. Based on availability and configuration, one or more of the training servers is assigned to the request received at 501. In some embodiments, the assigned training server is paired with a service node of the application server. In some embodiments, the assigned training server is one or more training servers of training servers 207 of FIG. 2.

At 505, a trained machine learning model is stored. For example, the trained machine learning model is stored in a data store. In some embodiments, the data store is model store 211 of FIG. 2, model store 331 of FIG. 3, and/or model store 431 of FIG. 4. The model storage is used to securely store the model for later use, such as to predict a machine learning result and/or to update or refresh the model. In various embodiments, the model is locked while stored. For example, a model can be encrypted while stored in the model store using a security key. In various embodiments, along with storing the locked machine learning model in a model store, the customer data located on the training server, including the training data, intermediate training results, and/or the trained machine learning model, is purged from the training server. For example, any local copies of the training data, security keys, intermediate and/or final training results, and/or other customer or sensitive data is deleted and/or purged from local storage and/or memory. The training server is then made available for processing additional training requests.

At 507, a machine learning prediction request is received. For example, a network client sends a machine learning prediction request which is received at an application server, such as a web application server. Similar to the training request received at 501, the request may utilize one or more encrypted network protocols such as HTTPS and TLS. In some embodiments, the request specifies the machine learning model to apply as well as input data for the prediction. For example, the specified machine learning model can be the model trained at 503 and stored at 505. In various embodiments, an identifier is used to specify the model. For example, a unique identifier specifies the machine learning model and the version of the model in the event there can be multiple versions of the model. In some embodiments, the input data specified for the prediction request is data stored in a customer database such as database 123 of FIG. 1 and/or a customer entity store such as entity store 203 of FIG. 2. In some embodiments, a service node of the application server, such as one of service nodes 303, 305, 307, or 309 of FIG. 3, receives and is assigned to facilitate performing the prediction request.

At 509, a machine learning prediction is scheduled and performed. For example, a prediction server is scheduled to perform the actual machine learning prediction using the specified machine learning model and input data. In some embodiments, the prediction server is assigned by a scheduler such as resource scheduler 205 of FIG. 2. For example, a cluster of prediction servers are available to process prediction jobs. Based on availability and configuration, one or more of the prediction servers is assigned to the request received at 507. In some embodiments, the assigned prediction server is paired with a service node of the application server. In some embodiments, the assigned prediction server is one or more prediction servers of prediction servers 209 of FIG. 2, prediction servers 311 of FIG. 3, and/or prediction servers 411 of FIG. 4.

At 511, the predicted result of a machine learning prediction is provided. For example, the prediction result determined at 509 is provided in response to the prediction request at 507. In some embodiments, the service node and application server receiving the request at 507 returns the prediction result. In some embodiments, the prediction result is stored in a customer data store such as database 123 of FIG. 1 and/or a customer entity store such as entity store 203 of FIG. 2. In various embodiments, in the event a prediction server is no longer needed for performing prediction results using the prepared machine learning model, the customer data, including the customer machine learning model, is purged from the prediction server. For example, any local copies of the customer or sensitive data including security keys are deleted and/or purged from local storage and/or memory. The prediction server is then made available for processing additional prediction requests.

Figure 6:
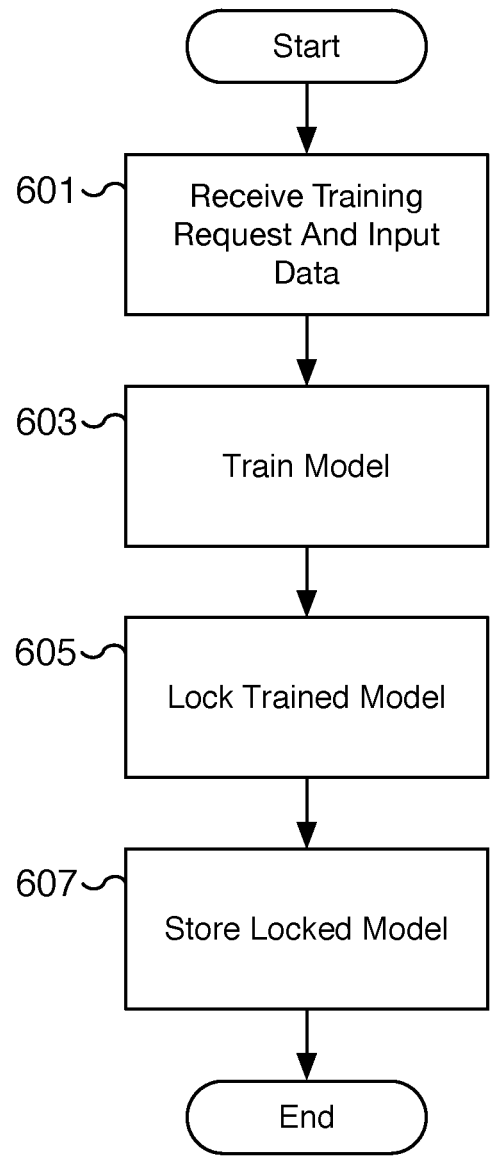
FIG. 6 is a flow chart illustrating an embodiment of a process for providing a machine learning service for training a machine learning model.

FIG. 6 is a flow chart illustrating an embodiment of a process for providing a machine learning service for training a machine learning model. For example, the process of FIG. 6 can be used to train a machine learning model and to securely store the training model for use to perform future predictions. In various embodiments, the process of FIG. 6 is performed using application and machine learning service platform 121 and/or database 123 of FIG. 1 and/or machine learning platform 200. For example, in various embodiments, incoming training requests are received at an application server. The requests are scheduled to utilize a training server by a scheduler such as resource scheduler 205 of FIG. 2, and the training is performed using training servers 207 of FIG. 2. In some embodiments, step 601 is performed at 501 of FIG. 5, step 603 is performed at 503 of FIG. 5, and/or steps 605 and/or 607 are performed at 505 of FIG. 5.

At 601, a machine learning training request and associated input data are received. For example, an incoming training request can be an incoming web application service request. The request may specify input data such as customer data. The input data can include the training data that can be retrieved from a customer database. In some embodiments, the request also includes configuration parameters for the machine learning training. In some embodiments, a service node of the application server, such as one of service nodes 303, 305, 307, or 309 of FIG. 3, receives and is assigned to facilitate performing the training request. Multiple service nodes can be available to process incoming requests for improved reliability and performance.

At 603, a machine learning model is trained. As described with respect to 503, the machine learning model is trained. In various embodiments, the training involves first scheduling a training server and then training the machine learning model using the appropriate training data on the training server.

At 605, the trained machine learning model is locked. For example, the trained machine learning model is locked using a security key. The security key can be provided by or specified by the customer. For example, a security key can be retrieved from a customer data store such as database 123 of FIG. 1 and/or entity store 203 of FIG. 2. In some embodiments, the security key is a public key used to encrypt the trained model. In some embodiments, the security key is retrieved from a key management system used to manage customer keys. In some embodiments, the locking of the trained model is performed by the training server and/or by the model store. Once the model is locked, access to the security can be revoked.

In some embodiments, once the model is trained, a security key is generated and used to lock the model. For example, a key generation server can generate (or retrieve) a security key. The security key is then used to encrypt the trained model. Once the encryption is complete, the security key can be stored in a customer data store such as database 123 of FIG. 1 and/or entity store 203 of FIG. 2. In various embodiments, the key is associated with the model using a customer database and/or key management system.

At 607, the locked machine learning model is stored. As described with respect to 505, the trained machine learning model is stored in lock form in a model store. In some embodiments, the model store is configured to store multiple machine learning models including multiple versions of a model as well as models corresponding to different customers. The models can each be locked using a different security key, for example, a different customer security key. In various embodiments, each model has a unique identifier for identifying the model and for assigning models to prediction servers.

Figure 7:
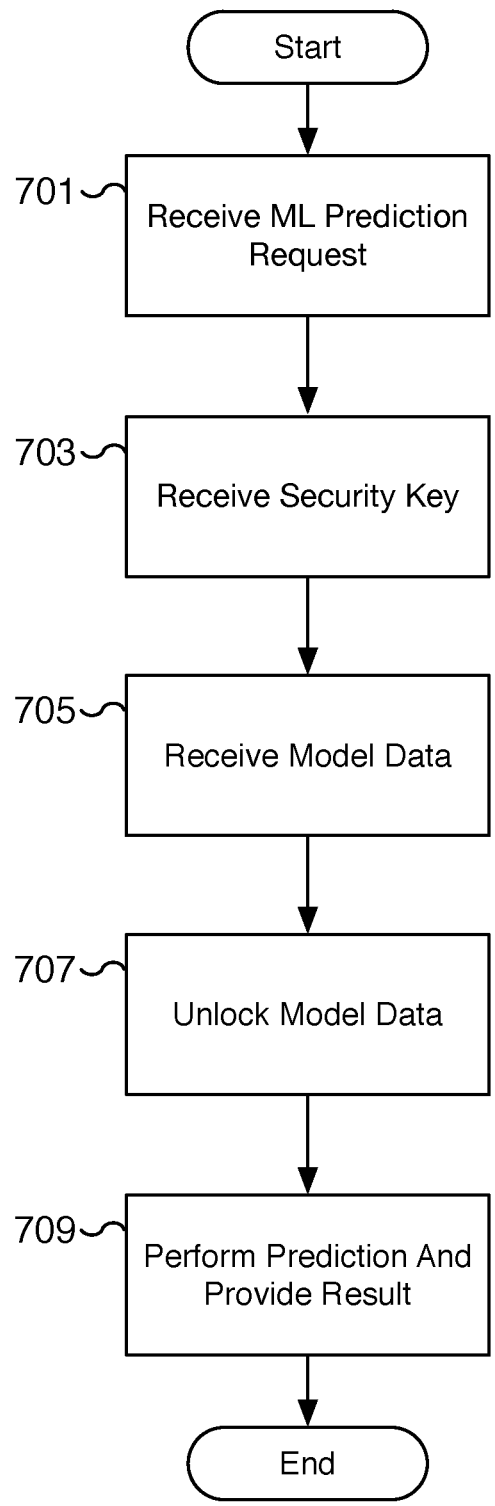
FIG. 7 is a flow chart illustrating an embodiment of a process for providing a machine learning service for predicting machine learning results.

FIG. 7 is a flow chart illustrating an embodiment of a process for providing a machine learning service for predicting machine learning results. For example, the process of FIG. 7 can be used to predict a machine learning result using a previously trained machine learning model. In various embodiments, the process of FIG. 7 is performed using application and machine learning service platform 121 and/or database 123 of FIG. 1, machine learning platform 200, machine learning platform 300, and/or machine learning platform 400. For example, in various embodiments, incoming prediction requests are received at an application server. The requests are scheduled to utilize a prediction server by a scheduler such as resource scheduler 205 of FIG. 2, and the prediction is performed using prediction servers 209 of FIG. 2, prediction servers 311 of FIG. 3, and/or prediction servers 411 of FIG. 4. In some embodiments, step 701 is performed at 507 of FIG. 5, steps 703, 705, and/or 707 are performed at 509 of FIG. 5, and/or step 709 is performed at 509 and/or 511 of FIG. 5.

At 701, a machine learning prediction request is received. For example, a network client sends a machine learning prediction request which is received at an application server, such as a web application server. In some embodiments, the request specifies the machine learning model to apply as well as input data for the prediction. For example, the specified machine learning model can be the model trained using the process of FIG. 6 and be stored in a model store such as model store 211 of FIG. 2, model store 331 of FIG. 3, and/or model store 431 of FIG. 4. The request may include a model identifier that identifies the version and model for prediction. The request may also identify the input data for which to apply the specified machine learning model. In some embodiments, the input data is included in the request and/or may be referenced by the request. For example, the referenced input data may be stored in a customer database from where it is retrieved. In some embodiments, a service node of the application server, such as one of service nodes 303, 305, 307, or 309 of FIG. 3, receives and is assigned to facilitate performing the prediction request.

At 703, a security key is received. For example, a security key associated with a locked machine learning model is received. In some embodiments, the security key is used to unlock and access the locked machine learning model. The security key may be a private key used to decrypt a model that has been encrypted with a corresponding public key. In some embodiments, the security key is a symmetric key, a passcode, a password, an access token, an access identifier, or another appropriate security key. In various embodiments, the security key can be received from a customer data store such as database 123 of FIG. 1 and/or entity store 203 of FIG. 2. In some embodiments, the key is received from a key management server. For example, a security token provided by a service node of an application server associated with the customer may be used to retrieve the security key from a key management server.

At 705, machine learning model data is received. For example, the data for the machine learning model specified by the request at 701 is received. In various embodiments, the model is locked and the corresponding data cannot be accessed without the appropriate security key. In some embodiments, the model is stored in a model store such as model store 211 of FIG. 2, model store 331 of FIG. 3, and/or model store 431 of FIG. 4. In some embodiments, the stored model can be prepared for unlocking at the model store. In some embodiments, the model data can be transmitted in locked form to the prediction server. In various embodiments, the model received is associated with the prediction server. For example, an identifier of the model is associated with an identifier of the prediction server. In some embodiments, the mapping allows the prediction server to be notified of updates to the model.

At 707, the received machine learning model is unlocked. Using the security key received at 703, the machine learning model data received at 705 is unlocked. For example, in some embodiments, an encrypted machine learning model is decrypted using the security key. In some embodiments, only a portion of the machine learning model is needed and only the required portion is unlocked. In various embodiments, the unlocking can be performed at or by different components. For example, in some embodiments, the unlocking is performed at the model store such as at model store 211 of FIG. 2, model store 331 of FIG. 3, and/or model store 431 of FIG. 4. In some embodiments, the unlocking is performed at the prediction server. In some embodiments, the unlocking is performed using a dedicated unlocking element.

At 709, a machine learning prediction is performed and the result is provided. As described with respect to steps 509 and/or 511 of FIG. 5, a prediction server applies the unlock machine learning model to the input data to determine a prediction result. The prediction result can be provided back to the requesting client via the appropriate application server and/or service node. In some embodiments, the prediction result is stored in a customer data store such as database 123 of FIG. 1 and/or entity store 203 of FIG. 2. In some embodiments, the prediction server is assigned by a scheduler such as resource scheduler 205 of FIG. 2. In some embodiments, the assigned prediction server is one or more prediction servers of prediction servers 209 of FIG. 2, prediction servers 311 of FIG. 3, and/or prediction servers 411 of FIG. 4. When the prediction task is complete, the customer data can be purged from the prediction server. In some embodiments, the models being used by prediction servers are tracked. In the event the model is no longer used by the prediction server, the prediction server is no longer associated with the model. In some embodiments, the unlocked model data may be used in future predictions and is cached at the prediction server for predicting the next prediction result.

Figure 8:
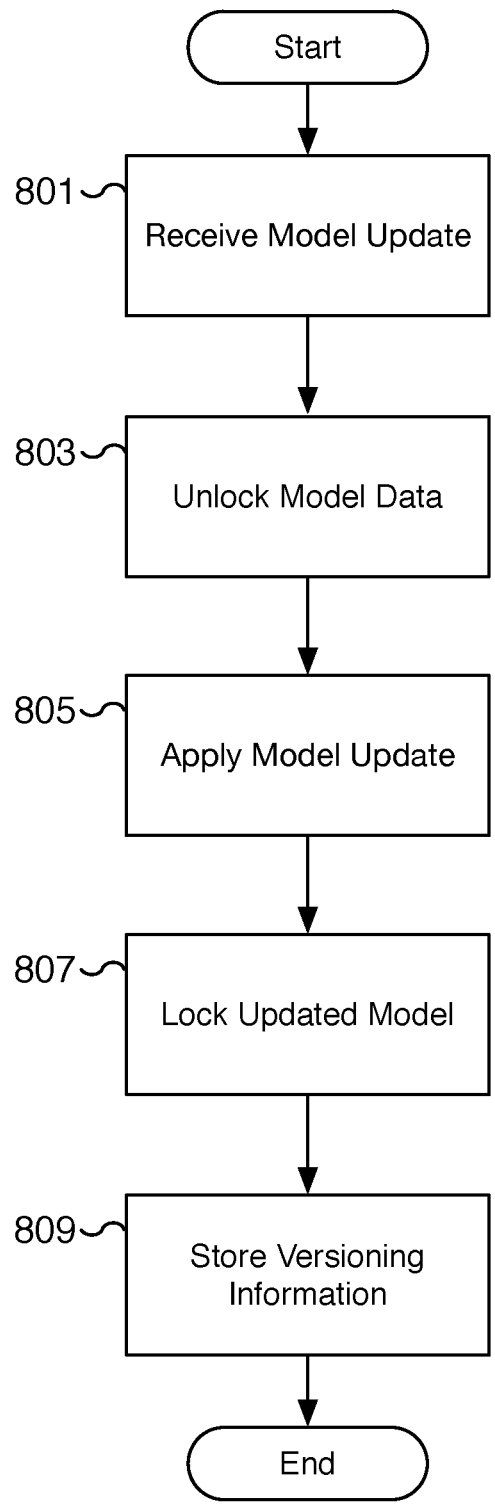
FIG. 8 is a flow chart illustrating an embodiment of a process for updating a machine learning model.

FIG. 8 is a flow chart illustrating an embodiment of a process for updating a machine learning model. For example, the process of FIG. 8 can be used to update a model trained using the processes of FIGS. 5 and/or 6. In some embodiments, the updated model is used by the processes of FIGS. 5 and/or 7 for predicting results. In various embodiments, the process of FIG. 8 is performed using application and machine learning service platform 121 and/or database 123 of FIG. 1, machine learning platform 200, machine learning platform 300, and/or machine learning platform 400. For example, in various embodiments, a machine learning model securely stored in a model store of a machine learning platform is updated and/or refreshed. In some embodiments, the prediction servers of the machine learning platform utilizing the updated model can receive notifications of the updates and/or the updated model itself.

At 801, an update to a machine learning model is received. For example, an update set of a model is received. The update set may be the result of additional prediction and/or training results performed after the last complete training was performed. In various embodiments, the update specifies the machine learning model the update corresponds to.

At 803, a machine learning model is unlocked. Using a security key associated with the model, a locked version of the machine learning model is unlocked. In various embodiments, the unlocking is performed similar to step 707 of FIG. 7.

At 805, an update is applied to the unlocked machine learning model. Using the update received at 801, an update is applied to the unlocked version of the model from step 803. In various embodiments, the most current state of the model is a combination of the unlocked version of the model and the update received at 801. In some embodiments, the most current state of the model corresponds to a combination of the original model and accumulated update sets until the next retraining.

At 807, the updated machine learning model is locked. Once updating is complete, the machine learning model is locked. In various embodiments, a security key is used to lock the model. In some embodiments, a new key is generated using a key management system and used to lock the newly updated model. In various embodiments, the locking is performed similar to step 605 of FIG. 6.

At 809, versioning information associated with the update is stored. For example, an identifier corresponding to the updated version of the model is stored. The model identifier can be used to reference the model, for example, for future predictions and/or notifications. In some embodiments, the models used by active prediction servers and their corresponding versions are tracked. The prediction servers with out-of-date models can be notified of an update and/or may be pushed an updated model when one is available. By tracking the model and the version of the model currently in use by active prediction servers, the prediction servers can be updated to utilize the most current model available. In various embodiments, prediction servers can be configured to accept updated models dynamically and to apply the newly updated model to determine prediction results. In some embodiments, the model versioning information is stored at the model store such as at model store 211 of FIG. 2, model store 331 of FIG. 3, and/or model store 431 of FIG. 4 and/or with customer data in a customer data store such as database 123 of FIG. 1 and/or entity store 203 of FIG. 2.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving a request to perform a prediction using a machine learning model of a specific entity;
    receiving a specific security key for the machine learning model of the specific entity;
    obtaining at least a portion of the machine learning model from a multi-tenant machine learning model storage, including by storing a utilization status of the machine learning model, wherein the utilization status associates an identifier of a prediction server utilizing the machine learning model;
    unlocking the machine learning model using the specific security key;
    performing the requested prediction; and
    providing a result of the prediction from the prediction server.

2. The method of claim 1, wherein the specific security key for the machine learning model of the specific entity is stored in a single-tenant storage.

3. The method of claim 1, wherein the requested prediction utilizes the machine learning model and an input data set, and wherein the input data set is retrieved from a single-tenant storage.

4. The method of claim 1, wherein the multi-tenant machine learning model storage is utilized to:
receive an incremental update to the machine learning model; and
apply the incremental update to the machine learning model.

5. The method of claim 4, wherein the multi-tenant machine learning model storage is utilized to:
unlock the machine learning model using a first security key prior to applying the incremental update; and
lock the updated machine learning model using a second security key after applying the incremental update.

6. The method of claim 4, wherein the multi-tenant machine learning model storage is utilized to store a version information associated with the incremental update to the machine learning model.

7. The method of claim 1, wherein the multi-tenant machine learning model storage is communicatively connected to the prediction server via a network attached storage, a storage area network, or a mounted storage device.

8. The method of claim 1, further comprising:
purging data of a first tenant from the prediction server, wherein the first tenant is different from the specific entity.

9. The method of claim 8, wherein the data of the first tenant includes a security key of the first tenant, a portion of a machine learning model of the first tenant, an input data of the first tenant, an intermediate prediction result of the first tenant, or a prediction result of the first tenant.

10. The method of claim 1, wherein the prediction server is included in a cluster of prediction servers.

11. The method of claim 1, wherein the utilization status indicates that that the machine learning model has been checked out by the prediction server.

12. The method of claim 1, wherein the utilization status includes a version identifier of the machine learning model.

13. The method of claim 1, wherein the result of the prediction is encrypted using an encryption key of the specific entity.

14. The method of claim 1, wherein the prediction server is configured to process requests to perform predictions from multiple tenants one at a time in a sequential order.

15. The method of claim 1, wherein a decrypted portion of the machine learning model is cached in a transitory memory of the prediction server.

16. The method of claim 1, wherein the specific security key is a private encryption key of a private-public key pair.

17. A method, comprising:
determining to perform a prediction using a machine learning model of a specific entity;
obtaining a specific security key for the machine learning model of the specific entity;
providing to a prediction server, the specific security key and a request to perform the prediction, wherein the prediction server is configured to obtain at least a portion of the machine learning model from a multi-tenant machine learning model storage and the prediction server is configured to utilize the specific security key to unlock the machine learning model, and wherein a stored utilization status associates an identifier of the prediction server utilizing the machine learning model; and
receiving a result of the prediction from the prediction server.

18. The method of claim 17, wherein the specific security key for the machine learning model of the specific entity is obtained from a storage dedicated for the specific entity.

19. A method, comprising:
receiving a request to train a machine learning model of a specific entity;
receiving a specific security key of the specific entity;
obtaining at least a portion of training data from a single-tenant data storage;
training the machine learning model using at least the obtained portion of the training data;
encrypting the machine learning model using the received specific security key of the specific entity;
providing the encrypted machine learning model for storage in a multi-tenant machine learning model storage; and
obtaining at least a portion of the machine learning model from the multi-tenant machine learning model storage, including by storing a utilization status of the machine learning model, wherein the utilization status associates an identifier of a prediction server utilizing the machine learning model.

20. The method of claim 19, further comprising:
purging a local copy of the at least portion of the training data obtained from the single-tenant data storage; and
purging a local copy of the received specific security key of the specific entity.

* * * * *